United States Patent
Pankratov

(10) Patent No.: US 6,208,769 B1
(45) Date of Patent: Mar. 27, 2001

(54) METHOD OF ACCURATELY LOCATING THE FRACTIONAL POSITION OF A TEMPLATE MATCH POINT

(75) Inventor: Kirill K. Pankratov, Acton, MA (US)

(73) Assignee: Acuity Imaging, LLC, Nashua, NH (US)

( * ) Notice: Subject to any disclaimer, the term of this patent is extended or adjusted under 35 U.S.C. 154(b) by 0 days.

(21) Appl. No.: 09/085,866

(22) Filed: May 28, 1998

(51) Int. Cl.[7] .................................................. G06K 9/32
(52) U.S. Cl. ................................................................ 382/300
(58) Field of Search ....................... 382/299, 300, 382/201, 151

(56) References Cited

U.S. PATENT DOCUMENTS

| | | | |
|---|---|---|---|
| 4,275,413 | * | 6/1981 | Sakamoto et al. ............... 358/80 |
| 4,897,805 | * | 1/1990 | Wang ............................... 364/521 |
| 4,918,622 | * | 4/1990 | Granger et al. ................. 364/518 |
| 5,129,051 | * | 7/1992 | Cain ................................. 395/133 |
| 5,384,648 | * | 1/1995 | Seidner et al. ................. 358/534 |
| 5,432,898 | * | 7/1995 | Curb et al. ..................... 395/143 |
| 5,495,537 | * | 2/1996 | Bedrosian et al. ............. 382/209 |
| 5,511,137 | * | 4/1996 | Okada ............................. 382/298 |
| 5,602,937 | * | 2/1997 | Bedrosian et al. ............. 382/151 |
| 5,671,298 | * | 9/1997 | Markandey et al. ........... 382/298 |
| 5,689,425 | * | 11/1997 | Sainio et al. ................ 364/469.03 |
| 5,717,785 | * | 2/1998 | Silver ............................... 382/202 |
| 5,930,407 | * | 7/1999 | Jensen ............................. 382/300 |
| 5,991,463 | * | 11/1999 | Greggian et al. .............. 382/298 |
| 6,005,978 | * | 12/1999 | Garakani ......................... 382/218 |
| 6,009,213 | * | 12/1999 | Miyake ........................... 382/300 |

OTHER PUBLICATIONS

Li et al., "Subpixel edge detection and estimation with a microprocessor–controlled line scan camera", IEEE Transactions on Industrail Electronics, Feb. 1988.*

* cited by examiner

Primary Examiner—Amelia Au
Assistant Examiner—Martin E. Miller
(74) Attorney, Agent, or Firm—Bourque & Associates, P.A.

(57) ABSTRACT

A method of accurately locating a sub-pixel maximum on a two-dimensional grid having an x axis and a y axis is provided. The method, which is especially suitable for locating a sub-pixel maximum, which falls intermediate grid point locations, begins by identifying a grid point having a maximum grid point value. Then, a quadrangle containing the sub-pixel maximum is determined by locating neighboring grid points along the x and y axes, which have the next greatest grid point values. Next, four one-dimensional, fractional maxima are computed along each side of a quadrangle. Next, two lines connecting one-dimensional maxima along the opposite sides of the quadrangle are computed. Finally, a location for the sub-pixel maximum is calculated where the two computed lines intersect.

7 Claims, 11 Drawing Sheets

FIG. 1A

| | -4 | -3 | -2 | -1 | 0 | +1 | +2 | +3 | +4 |
|---|---|---|---|---|---|---|---|---|---|
| +4 | -0.17 | -0.15 | -0.13 | -0.10 | -0.05 | -0.01 | 0.00 | 0.00 | -0.02 |
| +3 | -0.11 | -0.08 | -0.03 | 0.05 | 0.14 | 0.19 | 0.17 | 0.12 | 0.04 |
| +2 | 0.00 | 0.07 | 0.18 | 0.34 | 0.47 | 0.49 | 0.39 | 0.25 | 0.11 |
| +1 | 0.10 | 0.23 | 0.42 | 0.66 | 0.81 | 0.77 | 0.56 | 0.33 | 0.17 |
| 0 | 0.16 | 0.34 | 0.59 | 0.86 | 1.00 | 0.86 | 0.59 | 0.35 | 0.20 |
| -1 | 0.13 | 0.32 | 0.56 | 0.77 | 0.81 | 0.66 | 0.42 | 0.24 | 0.14 |
| -2 | 0.07 | 0.23 | 0.39 | 0.49 | 0.47 | 0.34 | 0.18 | 0.08 | 0.03 |
| -3 | 0.01 | 0.11 | 0.17 | 0.19 | 0.14 | 0.05 | -0.02 | -0.07 | -0.08 |
| -4 | -0.04 | 0.00 | 0.01 | 0.00 | -0.04 | -0.09 | -0.12 | -0.13 | -0.13 |

FIG. 2A

METHOD OF ACCURATELY LOCATING THE FRACTIONAL POSITION OF A TEMPLATE MATCH POINT

FIELD OF THE INVENTION

This invention relates to signal processing and analysis and is particularly useful in the fields of image analysis and machine vision.

BACKGROUND OF THE INVENTION

In computer or machine vision applications, an image is represented by a two-dimensional array of pixels. Each pixel typically has one gray value or 3 values representing each of the basic colors. Each value is an integer between 0 and a saturation (maximum) value, such as 255 in a typical 8-bit system.

One of the most important applications of industrial machine vision systems is accurate positioning: determining the coordinates of a given object within the field of view. Many high-precision manufacturing systems require very accurate object positioning. One way to improve accuracy is to increase the resolution of the vision system, which requires more expensive cameras and slows down the processing, since the image analysis time is usually proportional to the number of pixels in the image. The alternative approach is to use more accurate methods to calculate the fractional (sub-pixel) position of a pattern.

The cost and timing constraints mentioned above require many manufacturing systems to have accuracy much higher than the image resolution (pixel size), with a maximum allowed error only a few hundredths of a pixel.

The most widely used method of pattern matching is a normalized correlation algorithm. The normalized correlation coefficient between image pixels $I_{i,j}$ and pattern (template) pixels $T_{i,j}$ is defined as:

$$\frac{n * \sum_{i,j}(I_{i,j} * T_{i,j}) - \sum_{i,j} I_{i,j} * \sum_{i,j} T_{i,j}}{\sqrt{\left[n * \sum_{i,j} I_{i,j}^2 - \left(\sum_{i,j} I_{i,j}\right)^2\right] * \left[n * \sum_{i,j} T_{i,j}^2 - \left(\sum_{i,j} T_{i,j}\right)^2\right]}} \quad (1)$$

When the pixel values of the image are proportional to the corresponding pixel values of the template, i.e. $I_{i,j}=a+b*T_{i,j}$, with constant coefficients a and b, the normalized correlation coefficient reaches a maximum value of one (1.0).

If image pixel values are statistically independent of the template values, the correlation coefficient is close to zero (0.0). Thus defined, the normalized correlation score is insensitive to contrast and uniform lighting variation. This property makes it a very robust measure of similarity between two images.

Using normalized correlation for accurate match position determination typically involves two steps:
1. Search for a given pattern in the whole or part of the image. Find approximate positions of normalized correlation score maxima; and
2. Compute normalized correlation scores in a neighborhood around the approximate position of each local maximum. Fit a curve through this surface of score values, and compute the location of the maximum value on this curve.

The problem of interpolation of a smooth function from values sampled at regular grid intervals has received considerable attention in applied mathematics. Most interpolation algorithms are concerned with minimizing the error (absolute or mean square) between the interpolated and actual value at a given point (x,y).

One fairly simple and common way to find the maximum position is to approximate the function S(x,y) by a quadratic surface (paraboloid). This operation generally involves inverting a 6×6 matrix. The grid coordinates x and y are known beforehand, so the matrix can be inverted only once and the coefficients can be obtained by vector multiplication. After obtaining the coefficients, a simple linear transformation is required to reduce the quadratic form to a canonical one and find the position and value of the maximum.

This algorithm has been previously been implemented in commercial products developed by the assignee of this invention. It has an accuracy (maximum error in x or y direction) of about 0.05–0.1 pixel (1/20–1/10 of pixels size).

SUMMARY OF THE INVENTION

Accordingly, the present invention features a method of accurately locating a sub-pixel maximum on a two-dimensional grid having a x and a y axis. The method, which is especially suitable for locating a sub-pixel maximum which falls intermediate grid point locations, includes the following steps.

First, a grid point location having a maximum grid point value is determined. Then, a quadrangle containing a sub-pixel maximum is determined by locating neighboring grid points along the x and y axes, which have the next greatest grid point values. Next, four one-dimensional, fractional maxima are computed, each one-dimensional, fractional maximum being located along each side of the four sides of the quadrangle. Once the four, one-dimensional, fractional maxima are computed, straight lines are computed which connect the one-dimensional, fractional maxima located on opposite sides of the quadrange. Finally, a location for the sub-pixel maximum is calculated as the location of the two computed lines.

Each one-dimensional, fractional maximum is calculated as follows:

First, a grid point location having a maximum grid point value (the "grid point maximum") is located is identified by comparing grid point values of grid points located adjacent to and on opposite sides of the grid point maximum. Then a grid interval within which the one-dimensional, fractional maximum is located. Next, four sample grid points are selected. A first and second of the four sample grid points are located on a first side of the one-dimensional, fractional maximum. Third and fourth sample grid points are located on a second side of the one-dimensional, fractional maximum. Finally, a left and a right estimate of the position of the one-dimensional, fractional maximum are calculated using three-point parabolic approximations centered at grid points flanking the grid point maximum.

BRIEF DESCRIPTION OF THE DRAWINGS

These and other features and advantages of the present invention will be better understood by reading the following detailed description taken together with the drawings, wherein:

Figure 1A:
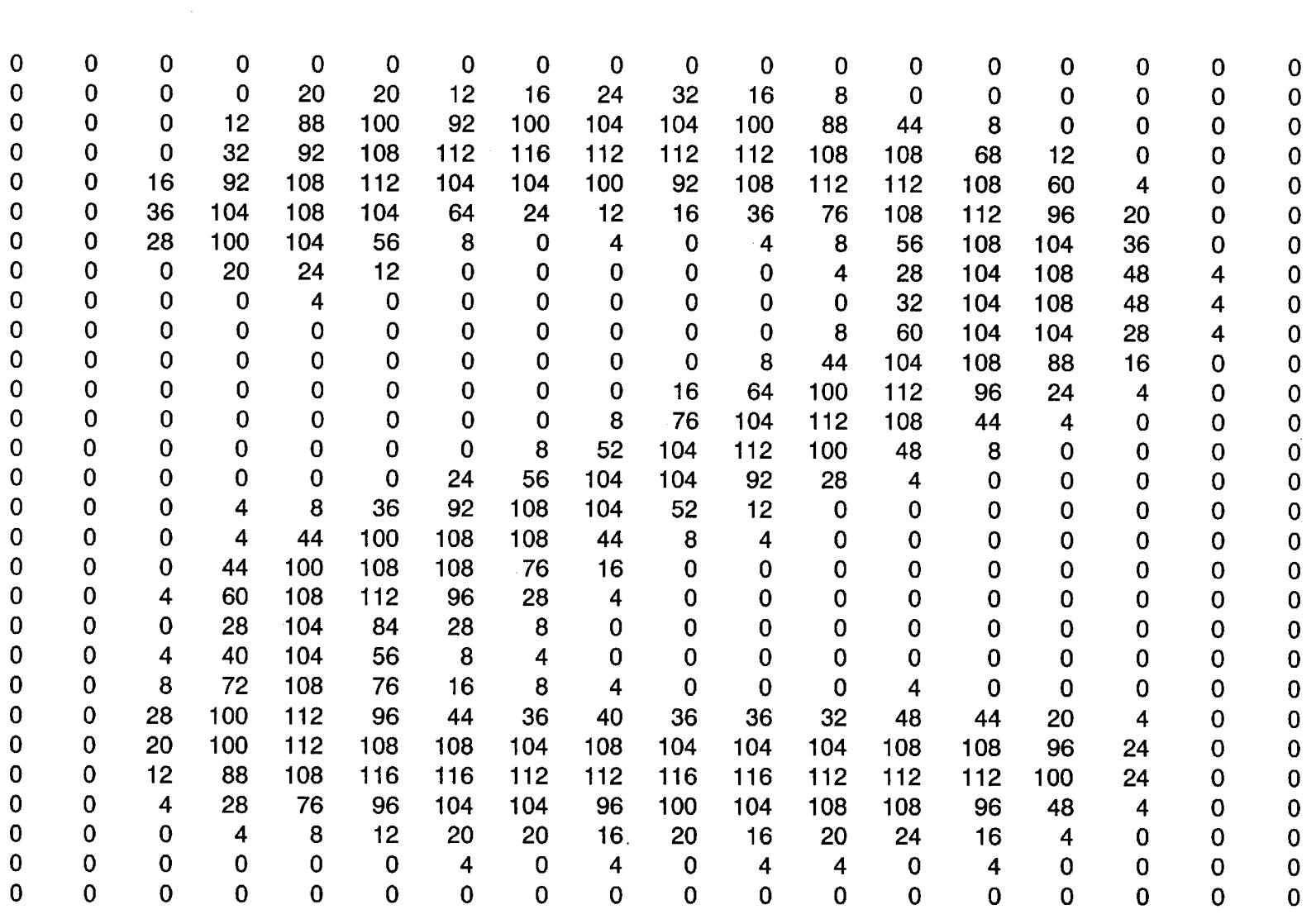

FIG. 1A is an example of a data set for an image utilizing gray-scale pixel values;

FIG. 2A is an example of a three-dimensional data set showing normalized correlation scores for small displacements of a template about the perfect match position;

DETAILED DESCRIPTION OF THE INVENTION

The method employed by the present invention to enhance the accuracy of determining the peak position begins with the observation that a one-dimensional function can be approximated and interpolated between grid point values much more accurately than a two-dimensional surface of a similar smoothness. Instead of approximating the correlation score $S(x,y)$ with a quadratic (or a higher-order) two-dimensional surface, we seek the position of a two-dimensional maximum as an intersection of two one-dimensional curves containing one-dimensional maxima along perpendicular x and y axes (geometric place of all points where derivatives $S_x=0$ and $S_y=0$). These curves are shown as lines F and K of FIG. 3, respectively.

Figure 1B:
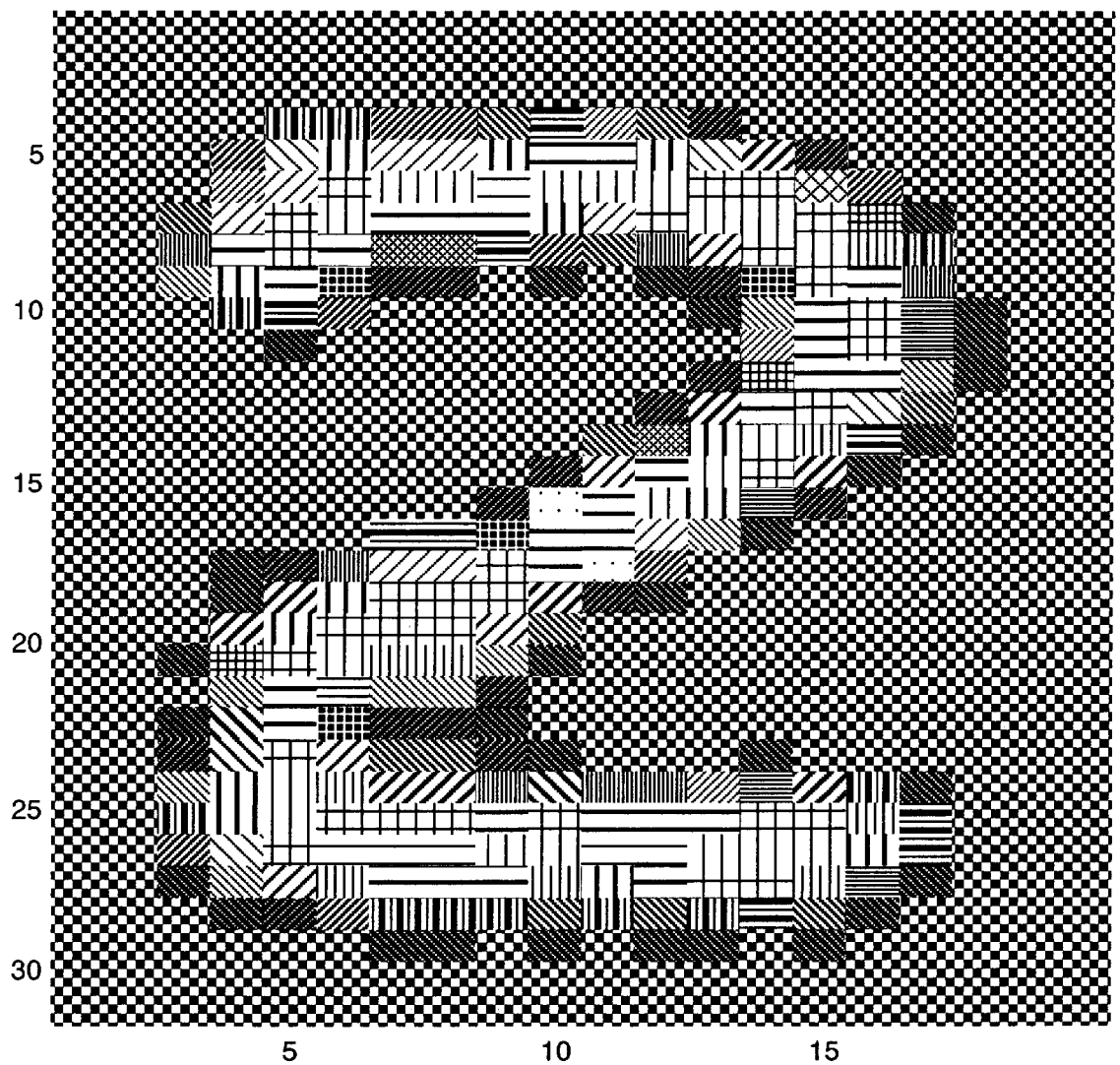
FIG. 1B shows an example of the gray-scale image for the data set of FIG. 1A.
Figure 2C:
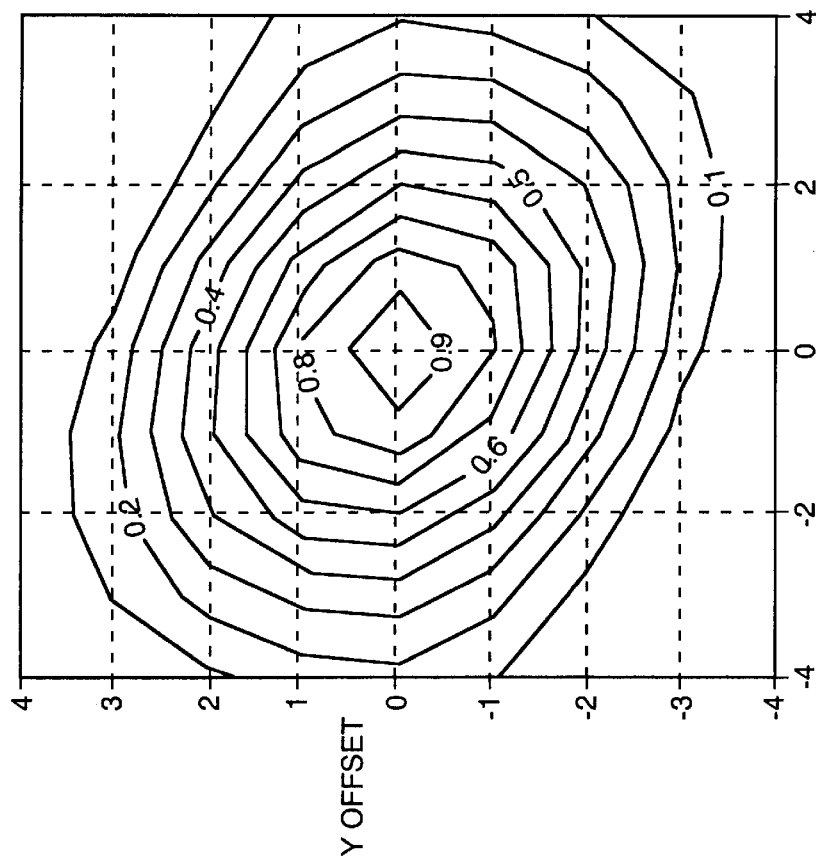
FIG. 2C is a top view of the three dimensional surface shown in FIG. 2B.
Figure 2B:
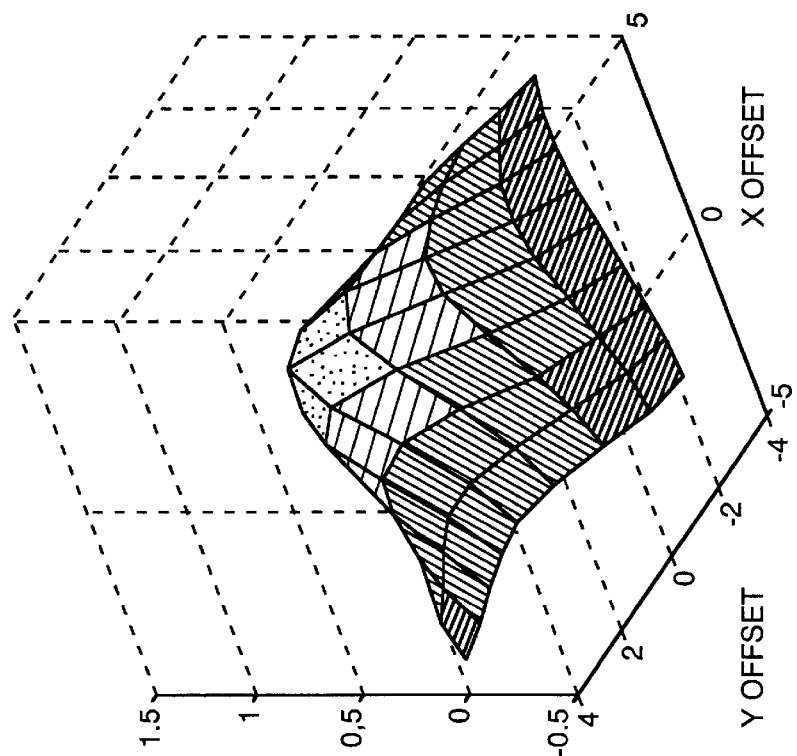
FIG. 2B shows a three dimensional surface of the data set of FIG. 2A.
Figure 3:
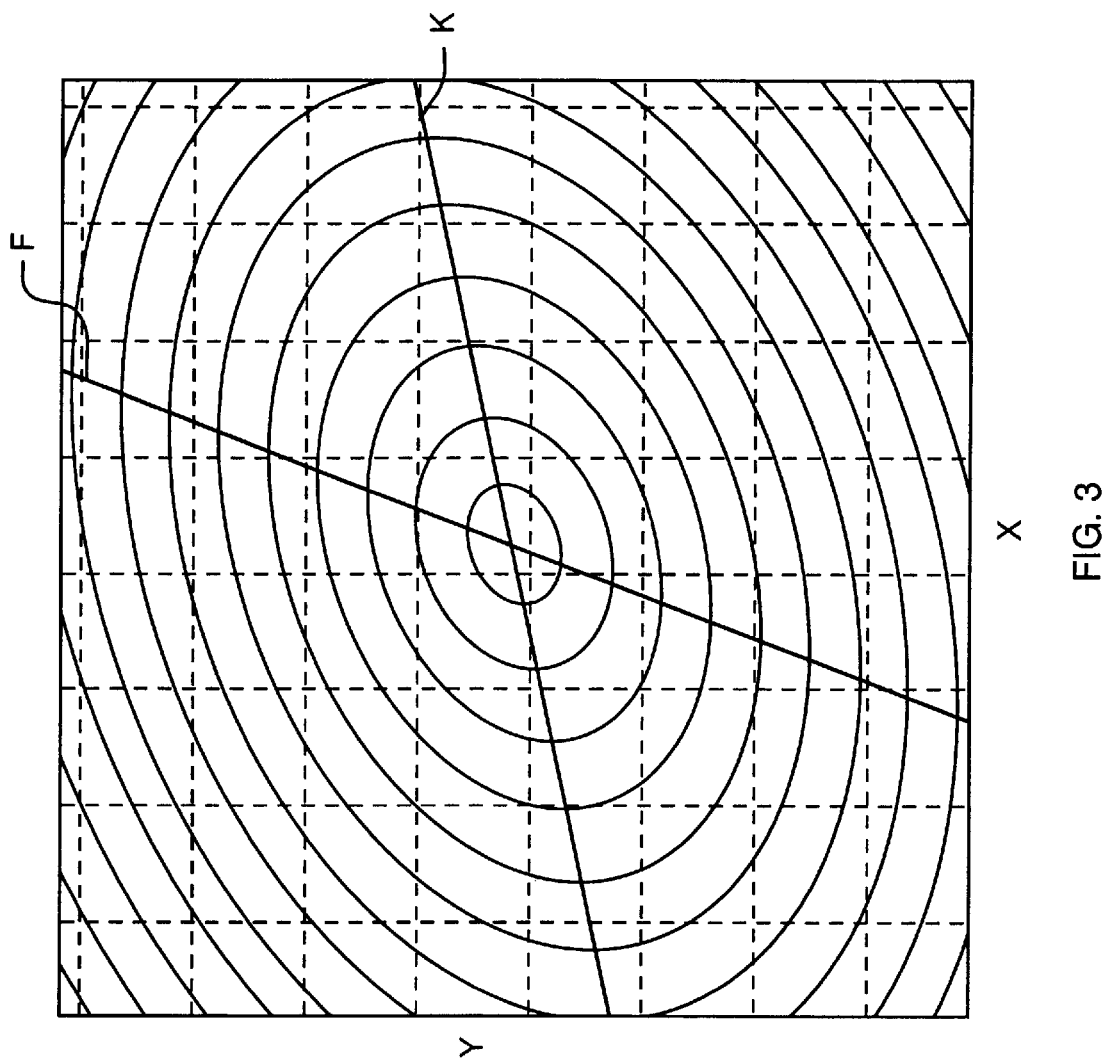
FIG. 3 shows the two lines of one-dimensional maxima along directions where x is a constant and where y is a constant on a parabaloid surface and the intersection of these two lines, which represents a point of two-dimensional maximum of the surface.

At first, the positions of one-dimensional maxima along the rows and columns of a grid (that is along the x and y axes) are determined. Then, the intersection point of these two lines which will coincide with the two-dimensional maximum point, are calculated. If the surface $S(x,y)$ is an exact paraboloid, these two curves will become straight lines. FIG. 3 shows a top view of these one-dimensional maxima on a paraboloid surface F and K.

If the main axes of this paraboloid are aligned with the x and y axes, the lines formed by the one-dimensional maxima will be also aligned with x and y axes and will be perpendicular to each other. When a paraboloid is skewed, such as is the case shown in FIG. 3, the lines intersect at some angle but will never be parallel to each other. Nonetheless, their intersection point will always coincide with the maximum of a two-dimensional paraboloid. Therefore, a principal object of the disclosed method is to accurately find a maximum of a one-dimensional function sampled at a regular interval.

FINDING THE MAXIMUM OF A ONE-DIMENSIONAL GRID

Figure 4:
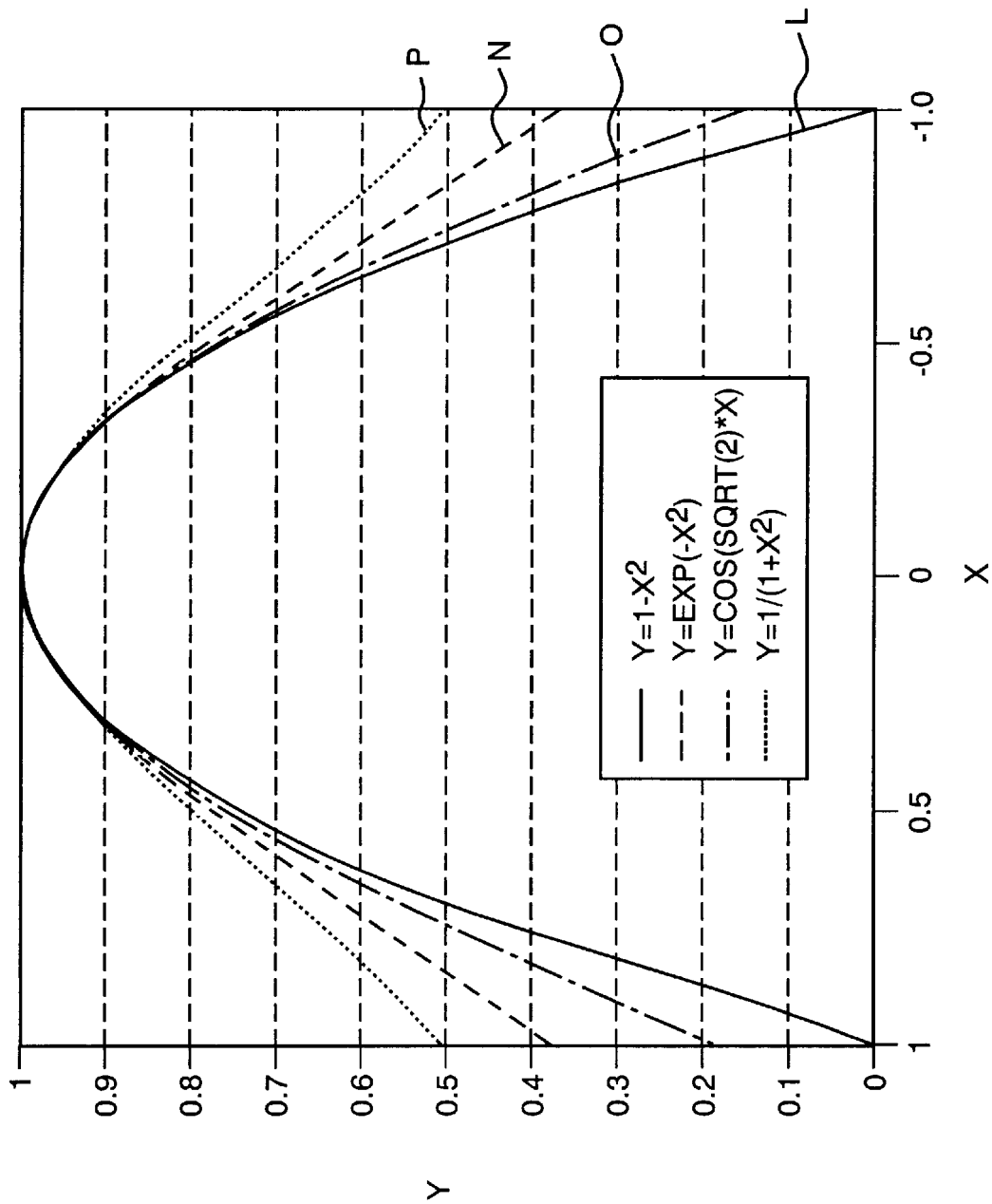
FIG. 4 is a graphical representation of four analytical functions, which are useful for peak approximation.

Typically, the normalized correlation function has a peak width of between several pixels and several tens of pixels (for large chunky patterns). Away from a peak it falls off to the background values close to zero (0). Although in the close vicinity of a peak, any smooth one-dimensional function can be approximated by a parabola, the behavior of the one-dimensional correlation score away from the peak can be better approximated by a function leveling off to some background value (such as gaussian). FIG. 4 shows some examples of one-dimensional functions having smooth peaks, which can be used to model the section of a correlation surface. Line L represents the function $y=1-x^2$. Line N represents the function $y=\exp(-x^2)$. Line O represents the function $y=\cos(\sqrt{2}*x)$. Line P represents the function $y=1/(1+x^2)$.

It should be noted that correlation function $S(x,y)$, in the vicinity of the maximum, has approximate rotational symmetry. In the case when an image is the same as a template (auto-correlation), the shift of the image by (x,y) is equivalent to the shift of the template relative to the image by (−x,−y), so in this case the correlation surface has a symmetry property $S(x,y)=S(-x,-y)$.

The asymmetric part of the correlation function near the match point will be only due to the difference in adjacent pixels around the templates. Therefore, in the vicinity of the maximum, the asymmetric part will be very small. This rotational two-dimensional symmetry implies the one-dimensional symmetries along any straight lines passes through the two-dimensional maximum. If a line is close enough to the maximum, then the asymmetric part will also be small. We implicitly use this property to construct our method of finding the maximum of the correlation surface, described below.

Figure 9:
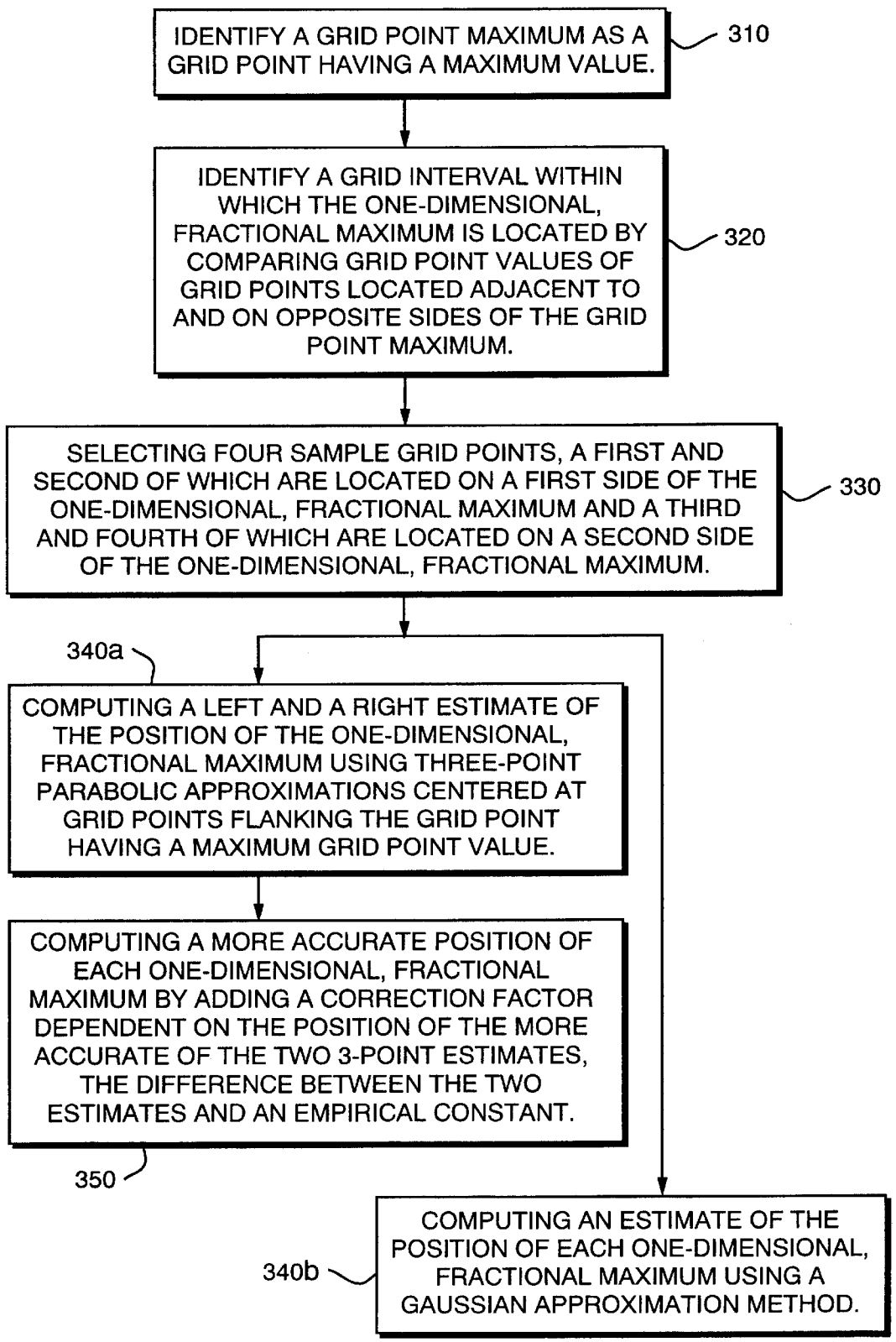
FIG. 9 is a flow chart showing the steps of computing each one-dimensional, fractional maximum according to step 300 of FIG. 8.

To find the fractional maximum of a two-dimensional sampled function $S(xy)$ we first consider a method of finding the maximum of the one-dimensional function $Y(X)$ (FIG. 9).

The simplest way to approximate the maximum position is to use a parabola passing through three (3) points surrounding a maximum grid point value. This gives the following expression:

$$X_0 = \frac{(Y_{i+1} - Y_{i-1})}{2(Y_{i+1} + Y_{i-1} - 2Y_i)} \tag{2}$$

If $Y_i$ is the maximum grid point value, this expression guarantees that the fractional position $X_0$ will belong to the interval [−0.5,0.5]. This simple formula has a typical accuracy (maximum error) of about 0.05–0.1 (5% to 10% of the distance between grid points).

Figure 5:
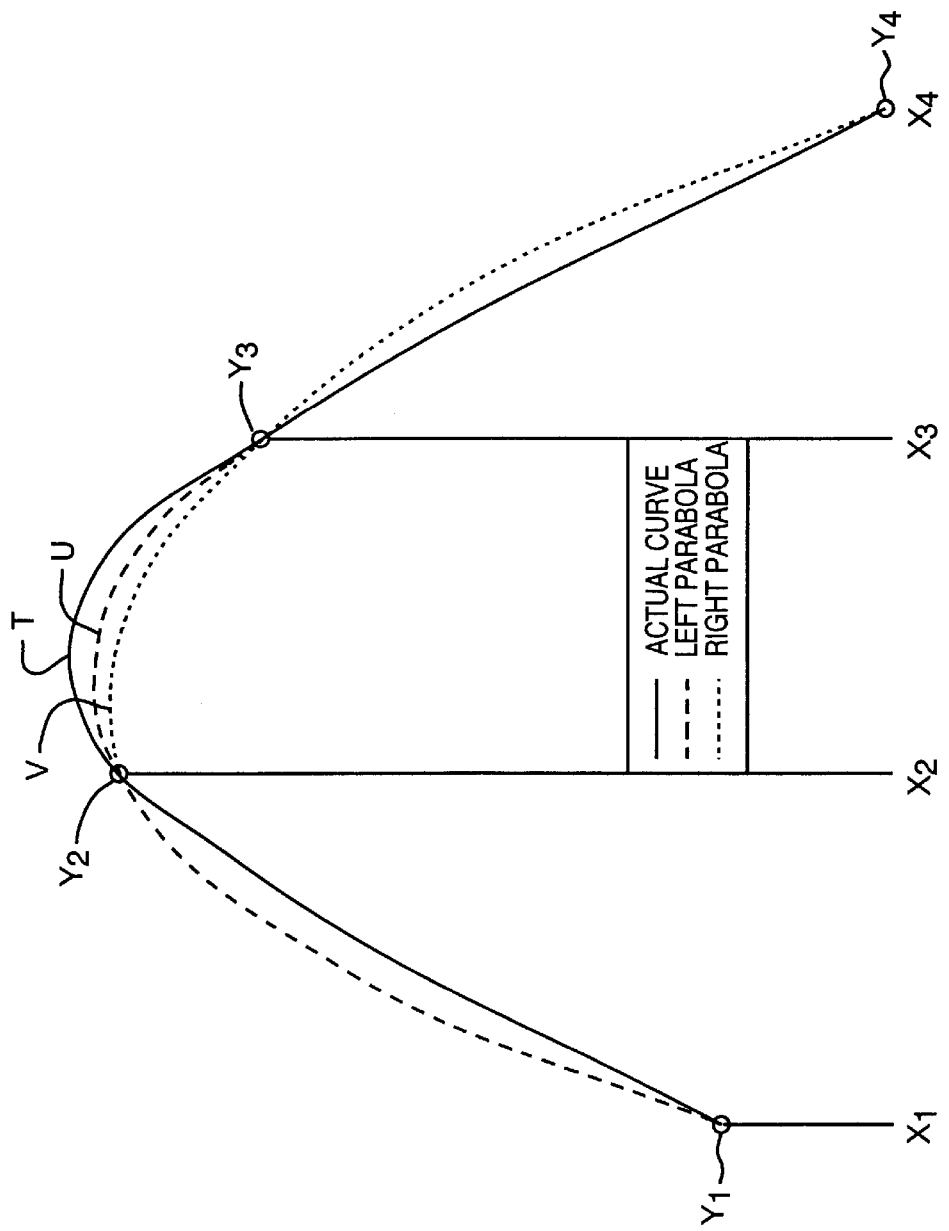
FIG. 5 shows one-dimensional peak estimates calculated using three points around the maximum and more accurate estimates using four data points in accordance with the teachings of the present invention.

To determine the maximum position more accurately, it is necessary to use more than three (3) points. For now we assume that our one-dimensional table has at least four points ($y_1$, $y_2$, $y_3$ and $y_4$), corresponding to four grid points ($x_1$, $x_2$, $x_3$ and $x_4$) and that the maximum sample value T FIG. 5, is not at the edge. More specifically, for the four points ($y_1$, $y_2$, $y_3$ and $y_4$) around the maximum grid point value shown in FIG. 5, the true maximum position T is between grid point values $y_2$ and $y_3$, which correspond to the second and the third grid points $x_2$ and $x_3$, respectively. This is determined since the value at the second grid point $y_2$ is larger than the value at the fourth grid point $y_4$ and the third grid point value $y_3$ is larger than the first grid point value $y_1$.

We can make two three-point estimates. The first estimate U, FIG. 5, uses, as its central point, the closest grid point value on a first side of the true maximum position $y_2$. The second estimate V uses, as its central point, the closest grid point value on a second side of the true maximum position $y_3$. The second side is opposite the first side. These estimates are illustrated in FIG. 5.

To derive a more accurate estimate of the fractional maximum we can combine the two estimates U and V. To describe the method by which these estimates are combined we begin by defining some terms and making a few assumptions.

Let the continuous function Y(X) be sampled at points $X_i$, i=1, ..., N>=4 at regular intervals. We assume that the function is sufficiently smooth, i.e. the characteristic scale of change is larger than the distance between grid points.

Another assumption is that the function Y(X) is approximately symmetric around the maximum. Thus, the function Y(X), in the vicinity of the maximum $X_0$, can be represented as a sum of symmetric and asymmetric parts as follows:

$$Y(X-X_0)=Y_s(X-X_0)+Y_a(X-X_0) \tag{3}$$

where $Y_s(h)=Y_s(-h)$ and $Y_a(h)=-Y_a(-h)$.

The function Y(X) is considered nearly symmetric around $X_0$ if $|Y_a(h)|<<(Y_s(0)-Y_s(h))$ for 0<h<2.

The method of finding the position of a one-dimensional, fractional maximum step 300, FIG. 9, according to the teachings of the present invention includes the following steps:

First, the sample grid point $X_m$ with a one-dimensional maximum value $Y_m$ (the grid point maximum) is identified, step 310. (In the example of FIG. 5, $X_m$ corresponds to $x_2$ and $Y_m$ corresponds to $y_2$.) Next, the grid interval within which the one-dimensional, fractional maximum is located is identified, step 320. This is accomplished by comparing grid point values of grid points located on opposite sides (e.g. to the left and to the right) of the grid point maximum. If $Y(X_{m-1})>Y(X_{m+1})$ then the fractional maximum $X_0$ is likely to be in the interval $X_m-0.5 \leq X_0 \leq X_m$. If $Y(X_{m-1})<Y(X_{m+1})$ then $X_0$ is likely to belong to the interval $X_m \leq X_0 \leq X_m+0.5$. In the example of FIG. 5, the interval containing the one-dimensional, fractional maximum is the interval between $x_2$ and $x_3$ since $y_3>y_1$.)

Next, four sample grid points are selected so that there are two grid points on each side of the one-dimensional, fractional maximum, step 330. For example, if the one-dimensional, fractional maximum $X_0$ is to the left of the grid point maximum $X_m$, the following four points are selected:

$Y_1=Y(X_{m-2})$ $Y_2=Y(X_{m-1})$ $Y_3=Y(X_m)$ $Y_4=Y(X_{m+1})$

On the other hand, if the fractional maximum is to the right of the grid point maximum $X_m$, the set of points shifted by one point to the right is selected as follows:

$Y_1=Y(X_{m-1})$ $Y_2=Y(X_m)$ $Y_3=Y(X_{m+1})$ $Y_4=Y(X_{m+2})$ (In the example of FIG. 5, the selected set of points include $y_1$, $y_2$, $y_3$ and $y_4$, which correspond to grid points $x_1$, $x_2$, $x_3$ and $x_4$, respectively.)

Two estimates of the position of the one-dimensional, fractional maximum are then computed, step 340a. In one embodiment of the invention, the two estimates are calculated using three-point parabolic approximations centered at the grid points flanking the grid point maximum. The equations for the two estimates are:

$$X_{left} = \frac{(Y_1 - Y_3)}{2(Y_1 + Y_3 - 2Y_2)} \tag{4}$$

and $$X_{right} = \frac{(Y_2 - Y_4)}{2(Y_2 + Y_4 - 2Y_3)}. \tag{5}$$

The two estimates $X_{left}$ and $X_{right}$ are used to compute a more accurate position of the one-dimensional, fractional maximum $X_0$. (In the example of FIG. 5, $X_{left}$ and $X_{right}$ correspond to points U and V, respectively). Let $X_c$ be the one of the two estimates $X_{left}$ and $X_{right}$ that is closer to the grid point maximum $X_m$ (For example, estimate V of FIG. 5). Then, a corrected estimate of the one-dimensional, fractional maximum $X_0$ is calculated by adding a correction factor to the location of the grid point maximum $X_m$, step 350, as follows:

$$X_0 = X_m + \frac{a(X_{right} - X_{left})R}{1-R}. \tag{6}$$

Equation 6 includes an interval factor R, where $$R = \left[\frac{X_c - X_m}{0.5}\right]^2$$

and where R is always in the interval [0, 1]. Equation 6 also includes an empirical constant a, which is substantially equal to 0.75. (In the example of FIG. 5, the corrected estimate $X_0$ should correspond to the actual maximum T.)

It should be noted that this combination of the two estimates $X_{left}$ and $X_{right}$ is somewhat counter-intuitive, because typically the errors of left and right estimates are of the same sign (see points T, U, and V in FIG. 5). Therefore, equation 6 involves extrapolation beyond the interval $X_{left}$, $X_{right}$ rather than interpolation between these two points. Nevertheless, equation 6 provides very good accuracy for a broad range of functions Y(X).

Figure 7A:
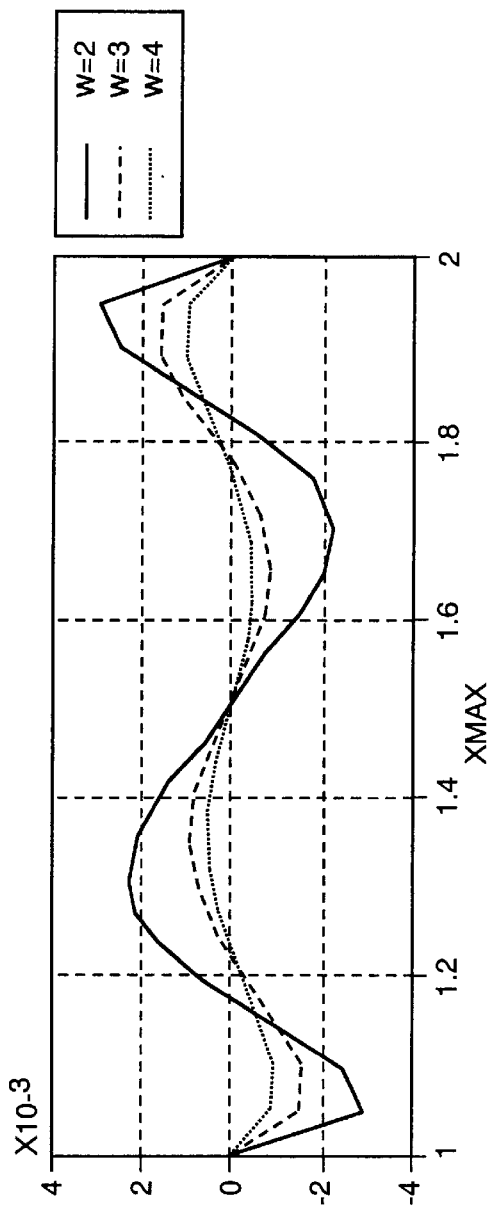
FIGS. 7A and 7B show two examples of error curves for different peak functions and different widths of a peak using the disclosed method.
Figure 7B:
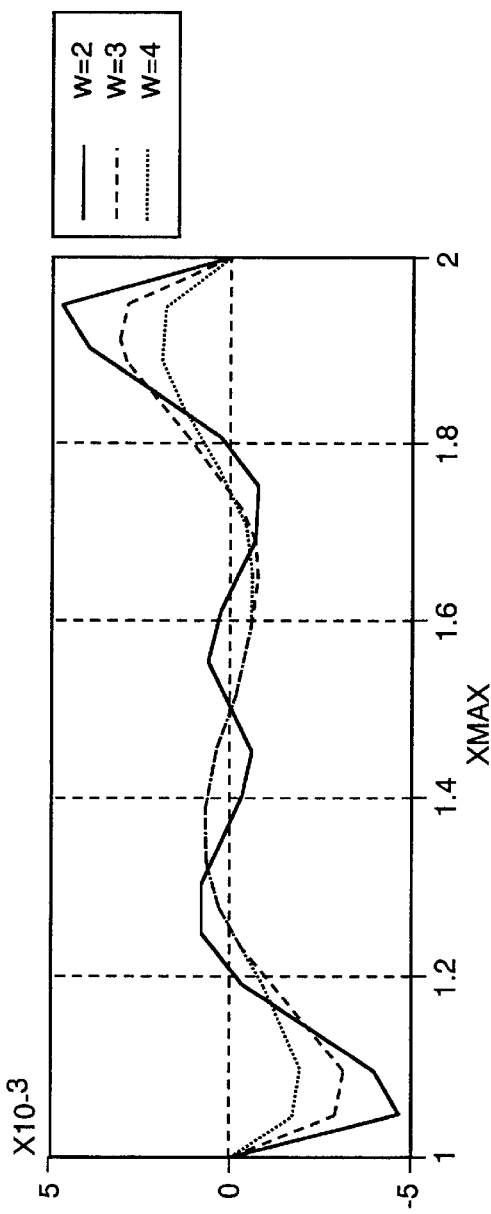

Tested using analytical functions having shapes resembling normalized correlation functions of real-world templates, this procedure gives maximum errors typically well below 0.01 grid step (1% pixel size). Some examples of error curves for different widths of the peak function are shown in FIGS. 7A and 7B. The various curves in FIGS. 7A and 7B show the differences between estimates calculated with equation (6). and the actual positions of maximum values depending on the fractional position of the actual maximum between two grid points. (Note that errors are greater where the actual maximum is located in a boundary grid of the image.) Each curve corresponds to different characteristic widths w of the peak. As can be seen, errors are larger when the peak is narrower (i.e. smaller w).

In the case when the fractional maximum is closer to the edge (so that, for example the second grid point value is the grid point maximum and the first grid point value is greater than the third in the case, for example, where one sample point is located on one side of the fractional maximum and at least three sample points on another other side of said fractional maximum) this formula will not be accurate enough and another estimate is needed.

In this case instead of using parabolic approximations, the method utilizes a gaussian approximation method, which utilizes a more realistic curve with a peak and fall-off, namely a gaussian curve, step 340b:

$$Y(X) = A + Be^{-\left(\frac{X-X_0}{W}\right)^2} \quad (7)$$

This function has 4 arbitrary parameters (A, B, $X_0$ and W) and can well approximate a broad range of curves with a peak. The first and second derivatives of the gaussian curve are computed as follows:

$$Y_x = -2B\left(\frac{X-X_0}{W^2}\right)e^{-\left(\frac{X-X_0}{W}\right)^2}, \text{ and} \quad (8)$$

$$Y_{xx} = \frac{-2B}{W^2}\left(1 - \frac{2(X-X_0)^2}{W^2}\right)e^{-\left(\frac{X-X_0}{W}\right)^2}. \quad (9)$$

The ratio of the second to the first derivatives, denoted as P are then computed. The derivative ratio is then used in the following equation:

$$-P(X-X_0) = 1 - 2\left(\frac{X-X_0}{W}\right)^2. \quad (10)$$

Estimates of the derivatives Yx, Yxx at the two grid points on each side of the maximum can be computed. The derivatives are approximated as follows:

$$Y_{x1} = \frac{(Y_3 - Y_1)}{2}, \quad (11)$$

$$Y_{x2} = \frac{(Y_4 - Y_2)}{2}, \quad (12)$$

Note that if the fractional maximum is between the first and the second grid points or between the third and the fourth grid points of the four points then the first derivative approximation is not equal to zero (0).

The ratio of the second to the first derivative at two internal points of the four-point set are computed. Denote by H the distance between the fractional maximum $X_0$ and the sample grid point which is closer to it.

$$-P_1 H = 1 - 2\left(\frac{H}{W}\right)^2 \quad (15)$$

$$-P_2(H+1) = 1 - 2\left(\frac{(H+1)}{W}\right)^2 \quad (16)$$

Excluding W from these two equations, we obtain a 3rd order equation for the fractional distance H:

$$(P_2-P_1)H^3 + (1-2P_1)H^2 - (2+P_1)H = 1 \quad (17)$$

Since we know the coefficients $P_1$ and $P_2$ this equation can be solved iteratively (for example by the Newton method). As a starting point, one can choose an estimate based on the three-point parabolic approximation centered at the maximum sample point or the point closest to it (if the grid point maximum is at the edge).

CALCULATION OF TWO-DIMENSIONAL MAXIMUM

Figure 6:
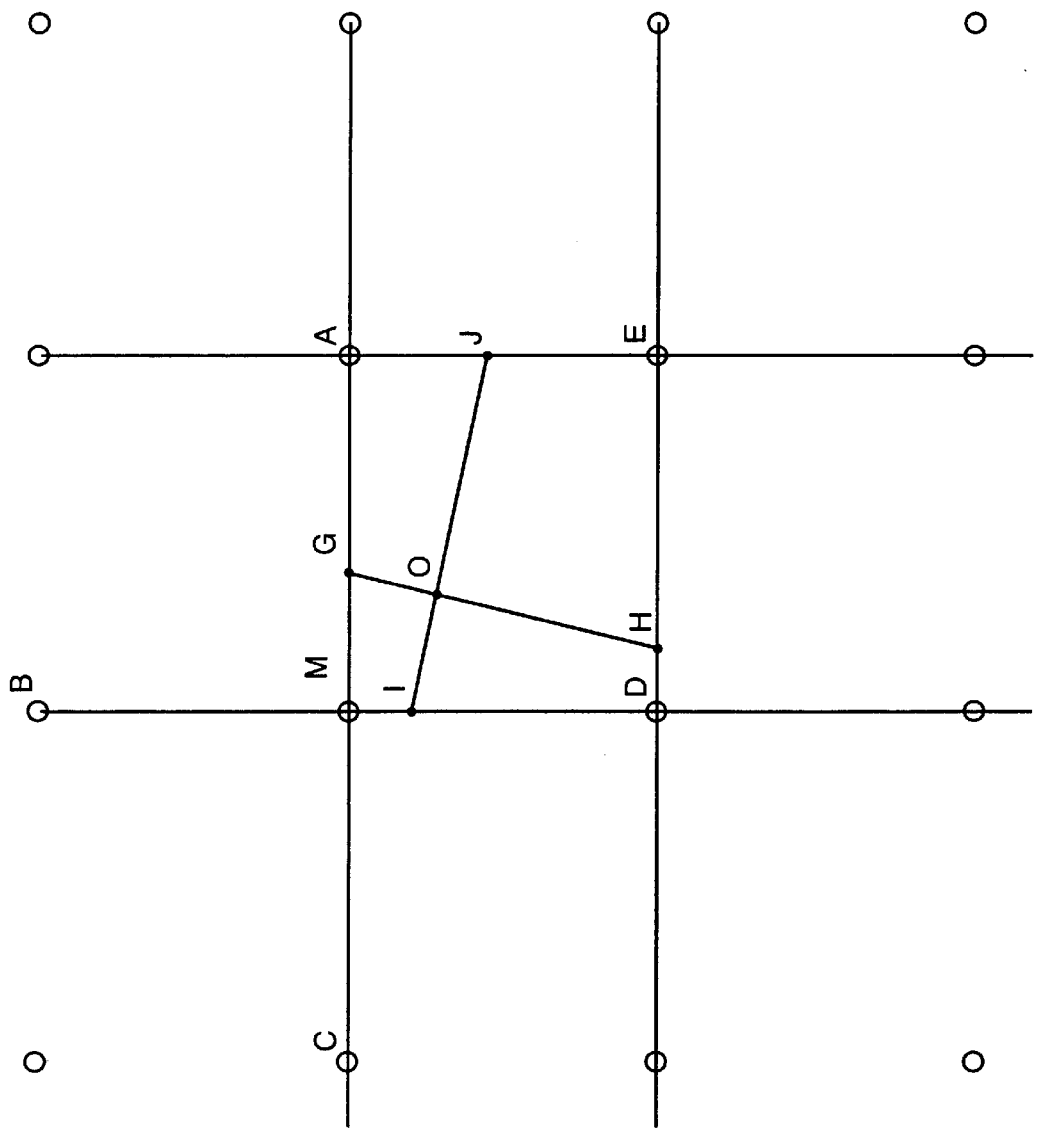
FIG. 6 shows a graphical representation of the calculation of a two-dimensional sub-pixel maximum according to the teachings of the present invention.
Figure 8:
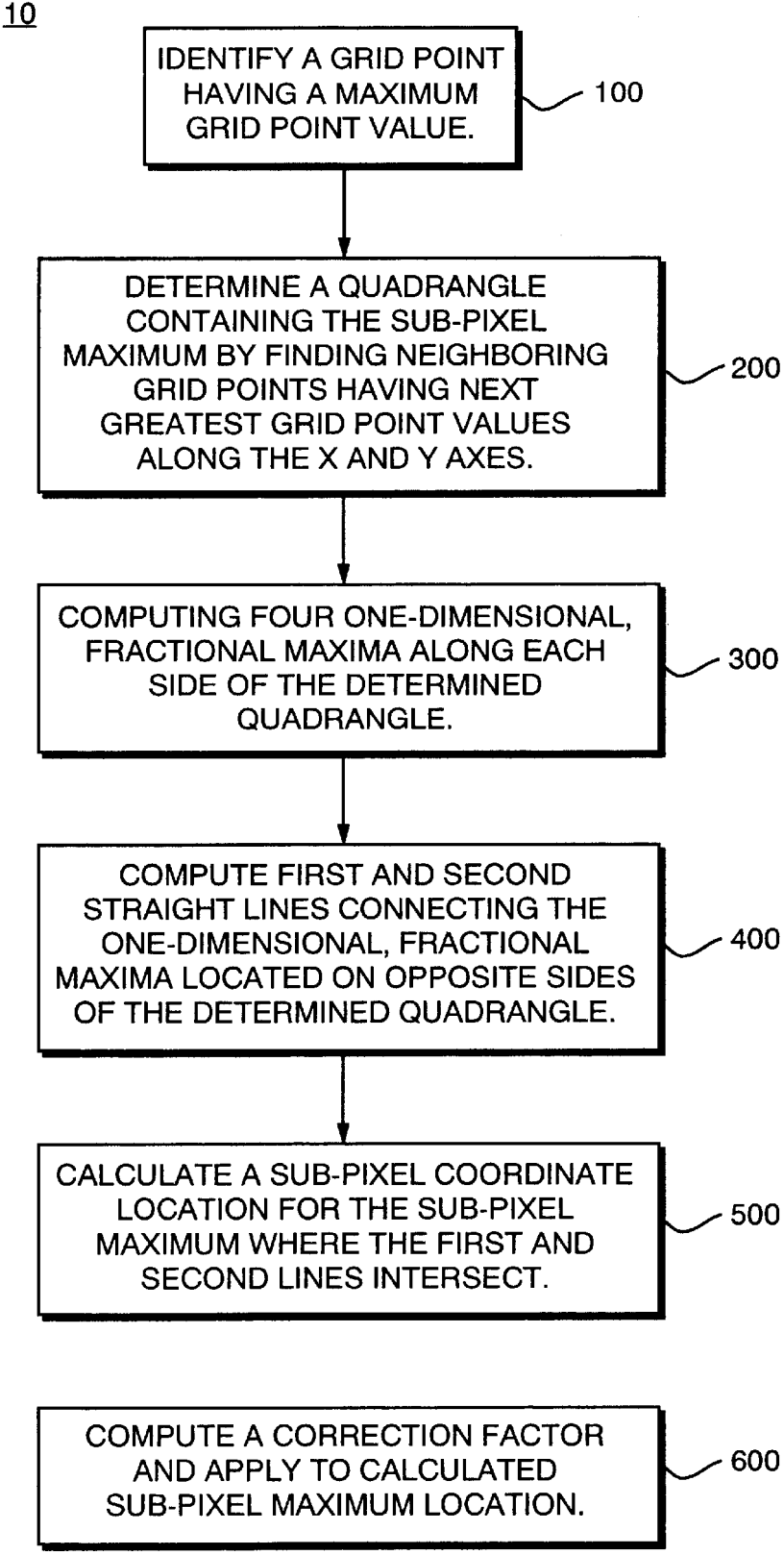
FIG. 8 is a flow chart showing the steps of the disclosed method of accurately locating a sub-pixel maximum on a two-dimensional grid.

The method of determining the fractional maximum in a two-dimensional grid is illustrated in FIGS. 6 and 8. This method 10, FIG. 8, begins with a search of all grid point values to identify the point M which has the maximum grid point value among all grid points, step 100. It is preferable that this point M is not at the edge of the grid, i.e. surrounded by neighboring grid points.

Next, the grid point values of all of the grid points neighboring point M are considered (A, B, C and D of FIG. 6). Among the neighbors of the point M, the grid points in the x and y directions having the next greatest grid point values are selected. Let for example, value at point A be greater than at B and value at D greater than at B (FIG. 6):

$$S(A)>S(B), S(D)>S(B) \quad (18)$$

This will indicate that the sub-pixel maximum is inside a quadrangle defined by grid points M,A,D, and E and closer to M than to the points A, D or E, step 200.

Next, four one-dimensional maxima along the lines MA, DE, MD and AE (that is all sides of the quadrangle MADE) are computed according to the one-dimensional procedure described in the previous section, step 300. Let the points G, H, I, J be the positions of maxima along the lines CA, DE, BD and AE correspondingly (see FIG. 7). Then the line GH will approximate a set of points of maxima along all lines parallel to the x-axis between MA and DE. The line IJ will approximate a set of points of maxima along all lines parallel to the y-axis between MD and AE, step 400.

Next, the intersection point O of the lines GH and IJ is calculated, step 500. Finally, a final correction to the coordinates of the maximum point is computed and applied to the calculated sub-pixel maximum coordinate location, step 600. Let $X_f$, $Y_f$ be the fractional position of the maximum point O (relative to the maximum grid point M) These values $X_f$, $Y_f$ will belong to the interval [−0.5 0.5]. For the best estimate for the position of the maximum we use the following correction terms:

$$X_f = X_f + b(X_f + 0.5)X_s(X_f - 0.5) \text{ and} \quad (19)$$

$$Y_f = Y_f + b(Y_f + 0.5)Y_s(Y_f - 0.5) \quad (20)$$

where $$X_s = \text{sign}(X_f)\text{sqrt}(|X_f|), \quad (21)$$

$$Y_s = \text{sign}(Y_f)\text{sqrt}(|Y_f|), \quad (22)$$

and where b is a fitting constant, which is substantially equal to −0.22 and is found empirically. Sign(x) is a function which is equal to −1 for negative values of x, 1 for positive values of x, and 0 when x=0.

Experiments with images numerically shifted by a fractional values in x and y directions show maximum errors below 0.01 pixel size for templates with good degree of symmetry and below 0.02–0.03 pixel size even for highly amorphous, skewed patterns.

Accordingly, the present invention provides a novel method for accurately locating a sub-pixel maximum-on a two-dimensional grid which is accurate and cost effective, and particularly well suited to industrial machine vision applications.

Modifications and substitutions by one of ordinary skill in the art are considered to be within the scope of the present invention, which is not to be limited except by the claims that follow:

What is claimed is:

1. An improved method of accurately determining a position of a given object on a two-dimensional grid having an x axis and a y axis within a field of view in a machine vision system, without the use of enhanced resolution apparatus, utilizing an improved method of calculating a sub-pixel maximum value, said sub-pixel maximum value calculation comprising the steps of:

searching all grid points values on said two-dimensional grid and identifying a grid point having a maximum grid point value;

considering all grid point values of all grid points neighboring said grid point having said maximum grid point value and selecting neighboring grid points on said x and Y axes having next highest grid point values;

defining a quadrangle having four sides, a first side of said quadrangle having endpoints defined by said grid point having said maximum grid point value and said grid point on said x axis having said next highest grid point value, a second side of said quadrangle having endpoints defined by said grid point having said maximum grid point value and said grid point on said y axis having said next highest grid point value, a third side of said quadrangle having endpoints defined by said grid point having said next highest grid point value on said x axis and a grid point having an x value equal to an x value of said grid point having said next highest grid point value on said x axis and a y value equal to a y value of said grid point having a next highest grid point value on said y axis, and a fourth side of said quadrangle having endpoints defined by said grid point having said next highest grid point value on said y axis and a grid point having an y value equal to a y value of said grid point having said next highest grid point value on said y axis and an x value equal to an x value of said grid point having a next highest grid point value on said x axis;

computing a one-dimensional, fractional maximum along each side of said quadrangle;

computing a first line connecting said one-dimensional maxima computed on a first pair of opposite sides of said quadrangle and a second line connecting said one-dimensional maxima computed on a second pair of opposite sides of said quadrangle; and calculating a sub-pixel coordinate location for said sub-pixel maximum having an x coordinate and a y coordinate corresponding to an intersecting point of said first and said second lines.

2. The method of claim 1, wherein said step of computing each said one-dimensional fractional maximum along each side of said quadrangle comprises:

identifying a grid point on a grid axis corresponding to each side of said quadrangle having a one-dimensional maximum value as a grid point maximum;

identifying a grid interval on each said grid axis within which said one-dimensional, fractional maximum is located by comparing grid point values of grid points on each said grid axis located adjacent to and on opposite sides of said grid point maximum;

selecting a set of four sample grid points on each said grid axis, wherein a first and second sample grid point of each set of sample grid points are located on a first side of each said one-dimensional, fractional maximum and wherein a third and fourth sample grid point of each set of sample grid points are located on a second side of each said one-dimensional, fractional maximum;

computing a first and a second estimate of the position of each said one-dimensional, fractional maximum using three-point parabolic approximations centered at grid points flanking each said grid point maximum; and combining said first and second estimates of the position of each said one-dimensional, fractional maximum with their corresponding grid point maximum to compute a more accurate position of each said one-dimensional, fractional maximum.

3. The method of claim 2, wherein said step of combining said first and second estimates of the position of each said one-dimensional, fractional maximum with their corresponding grid point maximum to compute a more accurate position of each said one-dimensional, fractional maximum comprises:

calculating a corrected estimate of said one-dimensional, fractional maximum according to the equation:

$$X_0 = X_m + \frac{a(X_{right} - X_{left})R}{1-R};$$

where
    $X_m$=the grid point maximum,
    $X_{right}$=said first estimate,
    $X_{left}$=said second estimate, $$R = \left[\frac{X_c - X_m}{0.5}\right]^2,$$

$X_c$=one of said first and second estimates that is closer to said one-dimensional, fractional maximum, and
    a=0.75.

4. The method of claim 1 further comprising the step of performing a final correction to said sub-pixel coordinate location for said sub-pixel maximum comprising the steps of:

adding an x axis correction factor to the x coordinate of said maximum sub-pixel coordinate location; and adding a y axis correction factor to the y coordinate of said maximum sub-pixel coordinate location.

5. The method of claim 4, wherein said x axis correction factor is calculated according to the equation:

$$b(X_f+0.5)X_s(X_f-0.5);$$

where
    b is a fitting constant=−0.22,
    $X_f$=sub-pixel fractional maximum along x axis, and
    $X_s$=sign($X_f$)sqrt($|X_f|$).

6. The method of claim 1, wherein said step of computing each said one-dimensional fractional maximum comprises:

identifying a grid point maximum as a grid point having a maximum grid point value;

identifying a grid interval within which said one-dimensional, fractional maximum is located by comparing said grid point values of grid points located adjacent to and on opposite sides of the grid point maximum; and computing an estimate of the position of each said one-dimensional, fractional maximum using a gaussian approximation method.

7. The method of claim 6, wherein said gaussian approximation method comprises:

(a) computing a ratio of a second derivative of a gaussian curve containing said sub-pixel maximum to a first derivative of said gaussian curve;

(b) deriving a third-order equation including the ratio of derivatives of said gaussian curve and a fractional distance of said sub-pixel maximum from said grid point maximum; and (c) iteratively solving said third-order equation to determine said fractional distance.

* * * * *